United States Patent
Tadaki et al.

[11] Patent Number: 5,952,036
[45] Date of Patent: *Sep. 14, 1999

[54] FLUORESCENT LAYER FORMATION PROCESS

[75] Inventors: Shinji Tadaki; Nobuhiro Iwase; Souichiro Hidaka; Akihiro Mochizuki, all of Kawasaki, Japan

[73] Assignee: Fujitsu Limited, Kawasaki, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/789,302

[22] Filed: Jan. 30, 1997

[30] Foreign Application Priority Data

Sep. 5, 1996 [JP] Japan ..... 8-235042

[51] Int. Cl.$^6$ ............... B05D 5/06; C09K 11/08
[52] U.S. Cl. ............... 427/64; 252/301.4 R; 313/467; 156/67; 156/99; 427/226
[58] Field of Search ............ 427/64, 226; 252/301.4 R; 313/467; 156/67, 99

[56] References Cited

U.S. PATENT DOCUMENTS

| | | | |
|---|---|---|---|
| 5,132,045 | 7/1992 | Osaka et al. | 427/64 |
| 5,256,463 | 10/1993 | Osaka et al. | 427/64 |
| 5,277,840 | 1/1994 | Osaka et al. | 427/64 |
| 5,716,855 | 2/1998 | Lerner et al. | 436/533 |

OTHER PUBLICATIONS

Billmeyer, Jr., F.W. *Textbook of Polymer Science,* Wiley & Sons, N.Y., 1966, p. 404.

*Primary Examiner*—Janyce Bell
*Attorney, Agent, or Firm*—Staas & Halsey

[57] ABSTRACT

A fluorescent layer formation process which comprises dispersing particles of a fluorescent substance and particles of a (meth)acrylic resin as a binder or particles of the fluorescent substance coated with the (meth)acrylic resin in a medium incapable of dissolving the resin therein to prepare a fluorescent paste; applying the fluorescent paste on a fluorescent layer formation surface to form a paste layer; and baking the paste layer at such a temperature that the resin is substantially decomposed or burnt out, thereby to form a fluorescent layer.

11 Claims, 5 Drawing Sheets

FLUORESCENT LAYER FORMATION PROCESS

BACKGROUND OF THE INVENTION

1. Field of the Invention

The present invention relates to a fluorescent layer formation process, which is suitable for the fabrication of a color plasma display panel (PDP).

2. Related Prior Arts

Surface discharge PDPs have been commercially available as color display devices. The surface discharge PDPs have barrier ribs partitioning a discharge space on a pixel-by-pixel basis to define cells (display elements). Formed between the barrier ribs are fluorescent layers, which cover not only portions of a substrate surface extending parallel to a display surface but also side walls of the barrier ribs extending generally perpendicular to the display surface. The formation of the fluorescent layers is typically achieved by a screen printing method, because three-color (R, G, B) fluorescent layers should regularly be arranged. More specifically, three fluorescent pastes are sequentially applied onto fluorescent layer formation surfaces on a color-by-color basis with the use of three screens each having an aperture pattern corresponding to color arrangement. The three fluorescent pastes thus applied are subjected to a predetermined drying process, and then simultaneously baked. A fluorescent substance to be used for the PDPs is a luminophor of ultraviolet ray excitation type. For example, $(Y,Gd)BO_3:Eu^{3+}$ is used as an R-fluorescent substance, $Zn_2SiO_4:Mn$ or $BaAl_{12}O_{19}:Mn$ is used as a G-fluorescent substance, and $3(Ba,Mg)O.8Al_2O_3:Eu^{2+}$ is used as a B-fluorescent substance.

For the formation of the fluorescent layers covering the side walls of the barrier ribs, it is required to blend a resin with the respective fluorescent substance to obtain a fluorescent paste. The resin blended in an appropriate amount increases the viscosity of the paste to keep the paste adhering onto the side walls of the barrier ribs during the drying process. The resin also serves to increase the filling density of fluorescent substance particles.

In a conventional PDP fabrication process, the fluorescent pastes are each prepared in the following manner: (1) ethyl cellulose as a resin of a viscosity builder component is dissolved in a solvent for preparation of a vehicle having a high viscosity (about 400 poises); and (2) a fluorescent substance is dispersed in the vehicle.

The PDPs employing fluorescent substances for color display generally suffer reduction in the color reproducibility due to deterioration of the fluorescent substances. For prevention of the deterioration of the fluorescent substances, the baking temperature for the formation of the fluorescent layers should be reduced as much as possible.

To burn out ethyl cellulose contained in the fluorescent paste, the temperature for the baking of the pastes should be controlled at not lower than 450° C. The deterioration of the fluorescent substance becomes more remarkable with an increase in the baking temperature. More specifically, the valence of europium (Eu) serving as an active substance changes, making it difficult for the fluorescent substance to emit light. Ethyl cellulose is a natural material which contains a relatively large amount of inorganic substances. The inorganic substances are not burnt out to remain as impurities in the fluorescent layers. Further, the compositions of the fluorescent layers are slightly different depending on raw materials to be used.

Known as a synthetic resin usable as the paste material is an acrylic resin which is susceptible for the pyrolysis to ethyl cellulose. An attempt has been made to form fluorescent layers by employing a high viscosity fluorescent paste prepared with the use of the acrylic resin in substantially the same manner as with the use of ethyl cellulose. However, when the fluorescent paste is printed on a substrate masked with a mesh having an emulsion mask (screen mask) and then the screen mask is removed from the substrate, the fluorescent paste strings between the substrate and the screen mask, and is locally brought back from the substrate to the screen mask so that the resulting paste layer does not have a uniform thickness. In the worst case, the stringing is so heavy that no fluorescent paste remains on the substrate. If the viscosity of the paste is reduced to avoid the stringing, the fluorescent substance precipitates in the paste, making it impossible to afford a fluorescent layer exhibiting a uniform luminance.

SUMMARY OF THE INVENTION

It is an object of the present invention to achieve the formation of a fluorescent layer having a uniform and sufficient thickness by employing a reduced baking temperature.

In accordance with the present invention, it provides a fluorescent layer formation process which comprises dispersing particles of a fluorescent substance and particles of a (meth)acrylic resin as a binder or particles of the fluorescent substance coated with the (meth)acrylic resin in a medium incapable of dissolving the resin therein to prepare a fluorescent paste;

applying the fluorescent paste on a fluorescent layer formation surface to form a paste layer; and baking the paste layer at such a temperature that the resin is substantially decomposed or burnt out, thereby to form a fluorescent layer.

Also, in accordance with the present invention, it provides a fluorescent paste comprising a particulate fluorescent substance, a particulate (meth)acrylic resin as a binder and a medium incapable of dissolving the resin therein, the fluorescent substance and the resin being dispersed in the medium.

Further, in accordance with the present invention, it provides a particulate fluorescent material comprising particles of a fluorescent substance and a (meth) acrylic resin, at least parts of surfaces of the particles being coated with the resin.

DESCRIPTION OF THE PREFERRED EMBODIMENTS

A fluorescent paste in which particles of a fluorescent substance and particles of a binder resin or particles of the fluorescent substance coated with the resin are dispersed is used in a fluorescent layer formation process of the present invention. The preparation thereof may be achieved by mixing the fluorescent substance particles and the resin particles with a medium, or by preliminarily coating all or parts of surfaces of the fluorescent substance particles with the resin by a spraying method or the like and mixing the coated fluorescent substance particles with the medium.

In a state where the resin is kept undissolved but dispersed, the interaction of the resin particles prevents the stringing of the fluorescent paste. This facilitates uniform-thickness application of the paste. Therefore, the selection of resins which satisfy application requirements is widened. Use of a resin excellent in the pyrolysis property allows for a reduction in the baking temperature.

The medium is required not to dissolve the resin therein, and desired not to cause swelling of the resin. Examples of specific media include organic solvents such as 1,2,6-hexanetriol and polypropylene glycol. As required, additives such as a dispersant and an anti-foaming agent may be blended with the fluorescent paste.

In the present invention, a (meth)acrylic resin is used as the resin. Examples thereof include homopolymers and copolymers of acrylic acid, acrylates, acrylamide, acrylonitrile, methacrylic acid and methacrylates. Exemplary (meth)acrylates include methyl (meth)acrylate, n-butyl (meth)acrylate and isobutyl (meth)acrylate. The aforesaid resins may be used either alone or in combination. Among those, polymers of methyl methacrylate and isobutyl methacrylate are preferred, and a mixture thereof and a copolymer thereof are particularly preferred.

The (meth) acrylic resin is available in various general purpose grades such as standard grade, heat-resistant grade, high fluidity grade and extrusion grade, among which the high fluidity grade is preferred. This is because the high-fluidity-grade (meth)acrylic resin generally has a lower molecular weight than those of the other grades, so that it is readily decomposed when baked.

More preferably, the (meth)acrylic resin can be pyrolyzed at a relatively low temperature, typically lower than about 400° C. (preferably lower than about 350° C.) when the resin is baked. More specific examples thereof include MP-4009 and MP-4951 available from Soken Chemical Co., Ltd.

Where the fluorescent paste is to be prepared by dispersing the fluorescent substance particles and the resin particles, too large diameters of the resin particles excessively reduce the filling density of the fluorescent substance particles, so that the resulting fluorescent layer fails to exhibit a predetermined luminance. The reduction in the diameters of the resin particles reduces the volume of the resin required for binding the fluorescent substance particles in a paste drying step, thereby improving the pyrolysis property of the resulting paste. The resin particles preferably have diameters less than one half the average particle diameter of the fluorescent substance. If the content of the resin is too high, the filling density is excessively lowered. A resin content of about 5 wt % presents virtually no problem. Where the fluorescent paste is to be prepared by dispersing the fluorescent substance particles coated with the resin, the thickness of the resin coating is controlled such that the binding can be facilitated in the drying step and the filling density at the end of a baking step can be improved.

The average diameter of the fluorescent substance particles is preferably 2 $\mu$m to 4 $\mu$m, and the average diameter of the resin particles is preferably 0.1 $\mu$m to 1 $\mu$m.

The fluorescent paste is prepared by dispersing the fluorescent substance particles and the resin particles or the coated fluorescent substance particles in the medium incapable of dissolving the resin therein. The dispersing method is not particularly limited as long as the method allows for uniform dispersion.

The resulting fluorescent paste is applied onto a fluorescent layer formation surface for formation of a paste layer. The fluorescent layer formation surface includes, for example, a surface on a substratre, a dielectric layer formed on the substrate side walls of barrier ribs partitioning a display area of a plasma display panel. Exemplary application methods include a screen printing method and a method by ejecting the fluorescent paste from a nozzle.

The formation of the fluorescent layer is achieved by baking the paste layer at such a temperature that the resin can be substantially decomposed or burnt. More specifically, the baking temperature is lower than about 400° C., preferably lower than about 350° C. Preferably, the resin is perfectly decomposed or burnt out in this baking step.

The fluorescent layer formation process of the present invention will be more specifically described with respect to a case where fluorescent layers are to be formed on side walls of barrier ribs partitioning a display area of a plasma display panel.

Figure 1A:
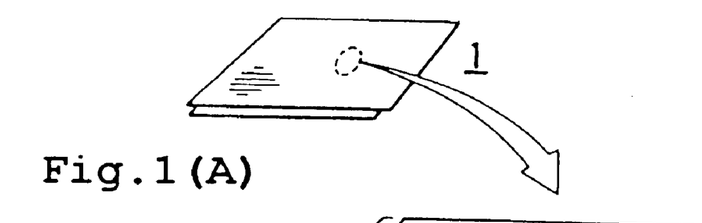
FIGS. 1(A) and 1(B) are perspective views illustrating the internal construction of a PDP according to the present invention.
Figure 1B:
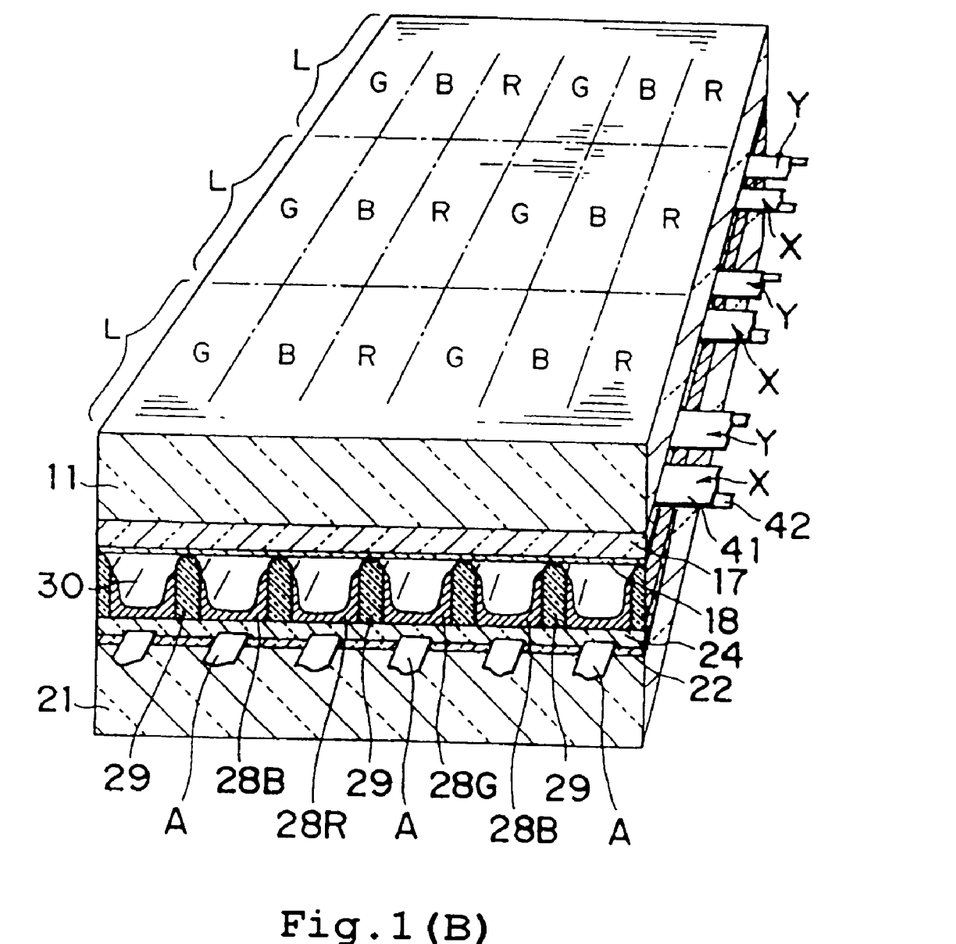

FIGS. 1(A) and 1(B) are perspective views illustrating the internal construction of a PDP 1 according to the present invention.

The PDP 1 is an AC-driven surface discharge PDP. A pair of sustain electrodes X and Y are arranged for each matrix display line L on an interior surface of a front glass substrate 11. The sustain electrodes X and Y each include a transparent electrode film 41 an a metal film 42, and are covered with a dielectric layer 17 for AC driving. A protective film 18 of magnesium oxide (MgO) is formed on a surface of the dielectric layer 17 by vapor deposition. On an interior surface of a rear glass substrate 21 are provided an underlying layer 22, address electrodes A, an insulating layer 24, barrier ribs 29 and fluorescent layers 28R, 28G and 28B of three colors (R, G, B) for color display. The barrier ribs 29 each have a linear configuration in plan. These barrier ribs 29 partition a discharge space 30 across lines on a subpixel basis, and define the discharge space 30 as having a predetermined gap (e.g., 150 $\mu$m). The discharge space 30 is filled with Penning gas comprised of a neon/xenon mixture. The dielectric layer 17, the underlying layer 22, the insulating layer 24 and the barrier ribs 29 are formed by respectively baking low-melting-point glass materials having different compositions under different baking conditions.

Each pixel for display comprises three subpixels arranged along a line L. Since the barrier ribs are arranged in a stripe pattern, subpixels in each row in the discharge space 30 are arranged in sequence across all the lines L. The subpixels in each row are adapted to emit the same color light. A structure within each subpixel constitutes one cell (display element).

In the PDP 1, the address electrodes A and the sustain electrodes Y are used for activation (light emission) and inactivation of each subpixel (addressing to each subpixel). More specifically, screen scanning (line selection) is achieved by sequentially applying a scan pulse to each of m sustain electrodes Y (m: the number of the lines), and a predetermined electrification state is established for each line L by opposed discharge (address discharge) between a sustain electrode Y and an address electrode A selected according to display information. When a sustain pulse having a predetermined peak value is applied alternately to the sustain electrodes X and Y after the addressing, surface discharge (sustain discharge) is induced on the surface of the substrate in a cell where a predetermined amount of wall charge is present at the end of the addressing. At the surface discharge, the fluorescent layer 28R, 28G or 28B is locally excited by ultraviolet rays radiated by the Penning gas to emit visible light. A portion of the visible light emitted from the fluorescent layer 28R, 28G or 28B passes through the glass substrate 11, serving for display.

The PDP 1 having the aforesaid construction is fabricated in the following manner. Front and rear panels of the PDP 1 are first prepared by providing predetermined components onto the glass substrates 11 and 21, and joined together with the periphery of a space therebetween being sealed. Then, the inside space is evacuated and filled with the Penning gas. The formation of the fluorescent layers 28R, 28G and 28B of the rear panel is achieved by a thick-film formation process in which the fluorescent pastes of the present invention are applied onto the glass substrate 21 after the formation of the barrier ribs 29, and the resulting paste layers are dried and baked.

Figure 2A:
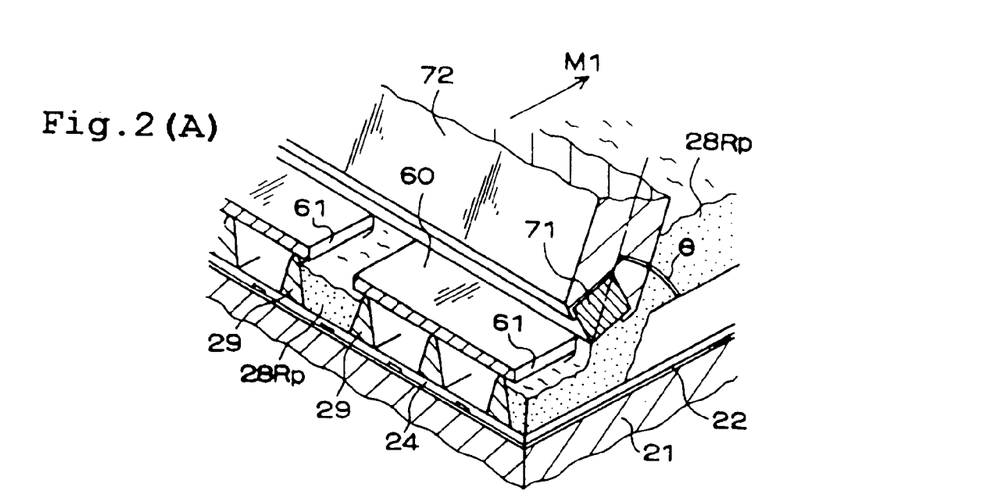
FIGS. 2(A), 2(B) and 2(C) are schematic diagrams illustrating an exemplary process for forming fluorescent layers.
Figure 2B:
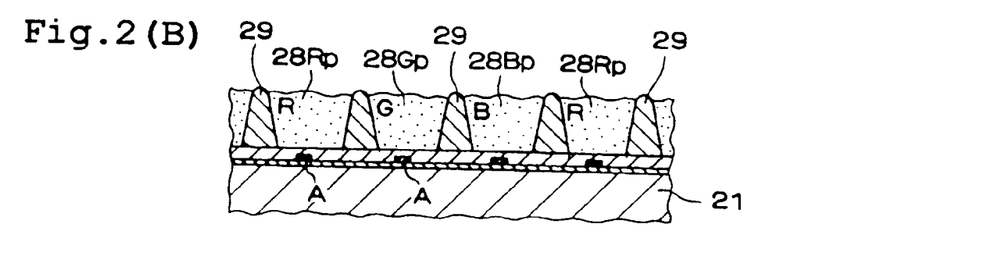
Figure 2C:
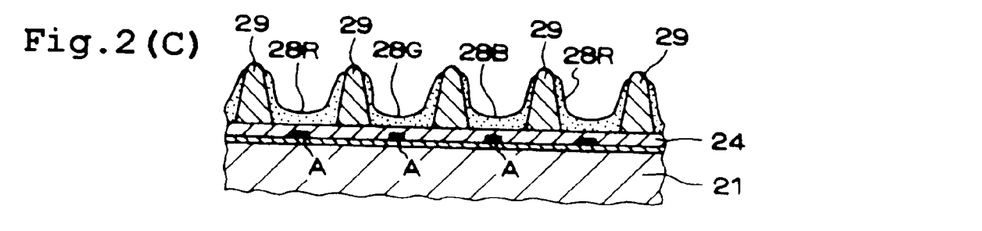

FIGS. 2(A) to 2(C) are schematic diagrams illustrating an exemplary process for forming the fluorescent layers.

Application of a fluorescent paste in the process shown in FIGS. 2(A) and 2(B) is achieved by a screen printing method, more specifically, a printing method according to Japanese Unexamined Patent Publication No. 5-299019 (1993) in which the paste is filled in a gap between barrier ribs. The screen printing method includes a smaller number of steps than a photolithography method and, therefore, is more advantageous in terms of productivity. Where fluorescent layers 28R, 28G and 28B of a plurality of colors are to be formed, the screen printing method prevents fluorescent substances of different luminous colors from being mixed with each other, thereby preventing the turbidity of the display colors.

Figure 5A:
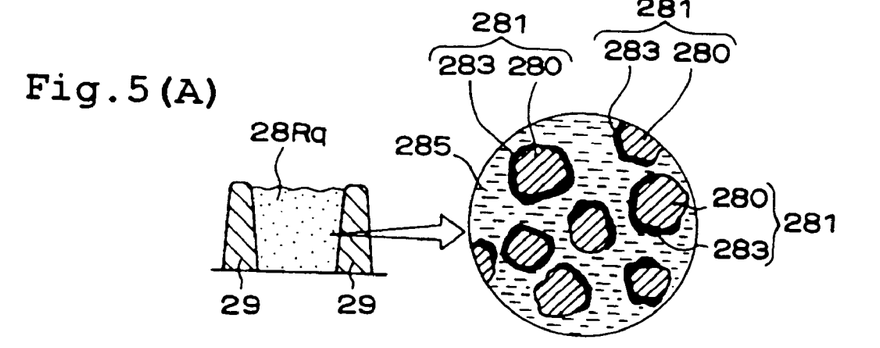
FIGS. 5(A), 5(B) and 5(C) are schematic diagrams illustrating aggregation of particles of a fluorescent substance.
Figure 5B:
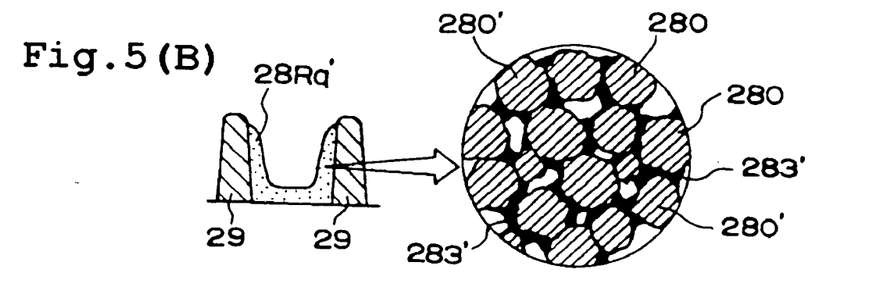

On the glass substrate 21 provided with the barrier ribs at a predetermined interval is properly positioned a screen mask 60 formed with openings 61 at an interval three times the rib interval so as to abut the barrier ribs 29. A fluorescent paste 28Rp, containing particles of a fluorescent substance of a predetermined luminous color (e.g., R) and the binder resin particles dispersed therein is applied between barrier ribs 29 from an opening 61 (see FIG. 2(A)). A fluorescent paste 28Rq (FIG. 5) in which particles of a fluorescent substance of a predetermined luminous color coated with the resin are dispersed may be used instead of the fluorescent paste 28Rp. In this application step, a gapbetween the barrier ribs is substantially filled up with the fluorescent paste 28Rp to perfectly cover a fluorescent layer formation surface including an exposed surface of the insulating layer 24 and side walls of the barrier ribs 29 by squeezing a relatively large amount of the fluorescent paste 28Rp into the gap toward the glass substrate 21 from the opening 61. For the squeezing of the fluorescent paste, a square squeegee 71 is employed which is set at an angle of 70 to 85. The square squeegee 71 is a hard rubber bar having a square cross section and is used with a holder 72 being attached thereto. To avoid uneven application, the square squeegee 71 is preferably moved in a direction Ml parallel to the barrier ribs 29. After the application, the fluorescent paste 28Rp is heated at 100° C. to 200° C. for drying thereof.

In turn, fluorescent pastes 28Gp and 28Bp of the other luminous colors (G and B) are sequentially printed onto the substrate to be filled in gaps between barrier ribs 29, and dried (see FIG. 2(B)). Thereafter, the dried fluorescent pastes 28Rp, 28Gp and 28Bp of the respective colors are baked at a temperature of about 400° C. As the medium in the pastes is evaporated and the resin is burnt, the volumes of the fluorescent pastes are reduced. Thus, the fluorescent layers 28R, 28G and 28B each having a predetermined thickness and covering the fluorescent layer formation layer are formed (see FIG. 2(C)). The thickness of the resulting fluorescent layer depends on the proportion of fluorescent substance particles contained in the paste. If the fluorescent layer is too thin, the luminance thereof is low. If the fluorescent layer is too thick, the address discharge is disturbed. Therefore, the proportion of the fluorescent substance in the fluorescent paste to be prepared is properly controlled depending on the dimensions of the cell. The compositions of the fluorescent substances may be the same as those conventionally employed. More specifically, powdery fluorescent substances such as $(Y,Gd)BO_3$:Eu, $Zn_2SiO_4$:Mn and $3(Ba,Mg)O.8Al_2O_3$:Eu may be used. The particle diameters of the fluorescent substances are preferably 2 $\mu$m to 3 $\mu$m.

Figure 3:
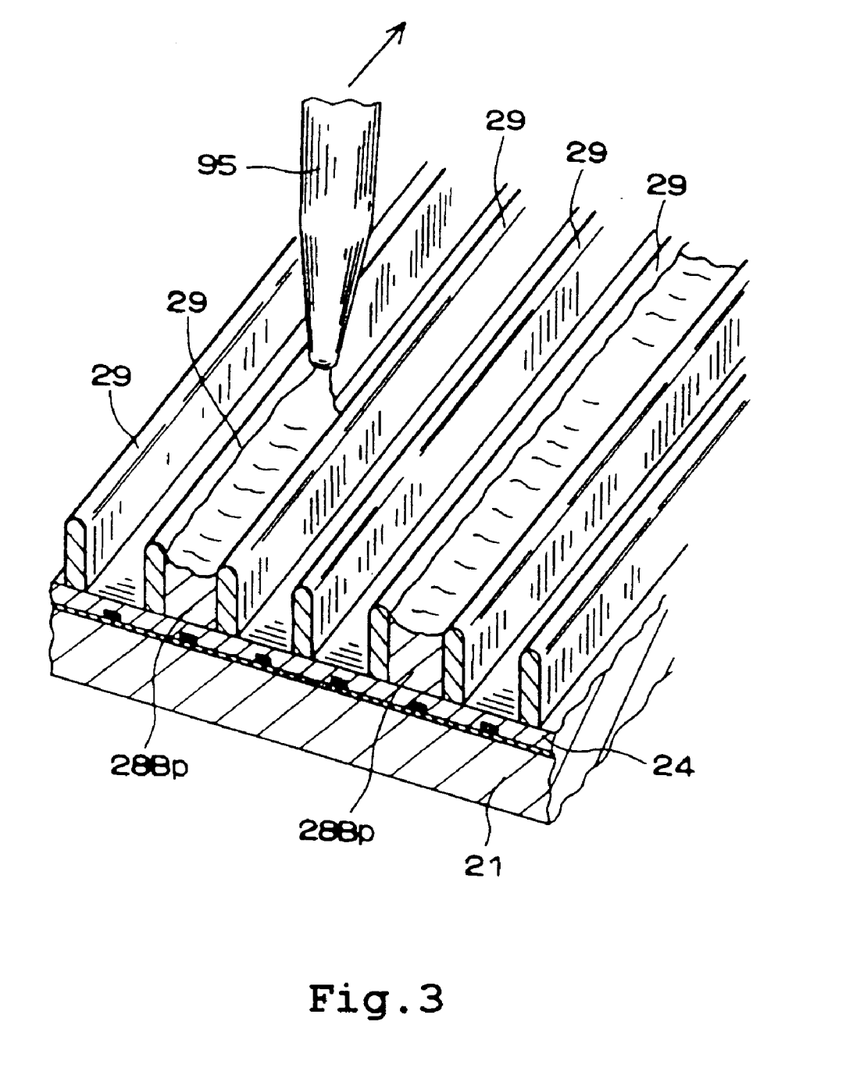
FIG. 3 is a perspective view illustrating an exemplary method for applying a fluorescent paste.

FIG. 3 is a perspective view illustrating another exemplary method for applying a fluorescent paste.

A dispenser (automatic application apparatus) can be used for the application of the fluorescent paste. More specifically, a nozzle 95 is positioned above a fluorescent layer formation surface, and moved relative to the substrate along barrier ribs 29 with the fluorescent paste 28Bp (e.g., of B) being ejected therefrom. Thus, a gap between the barrier ribs 29 is filled with the fluorescent paste 28Bp. Although one nozzle 95 is employed for each color in the case shown in FIG. 3, a plurality of nozzles 95 may be used to apply the fluorescent paste 28Bp simultaneously onto a plurality of application surfaces or to apply the fluorescent pastes 28Rp, 28Gp and 28Bp of three colors in parallel.

The use of the fluorescent pastes 28Rp, 28Gp and 28Bp each containing the particulate binder resin dispersed therein for the formation of the fluorescent layers prevents the stringing of the pastes when the squeegee 71 or the nozzle 95 is moved or when the screen mask 60 or the nozzle 95 is brought away from the glass substrate 21. Thus, excellent paste layers can be obtained.

FIGS. 4(A) to 4(C), 5(A) to 5(C) are schematic diagrams illustrating aggregation of particles of a fluorescent substance.

Figure 4A:
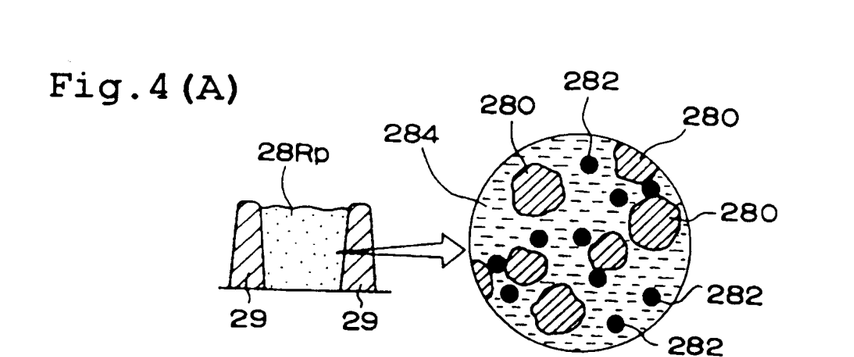
FIGS. 4(A), (4B) and 4(C) are schematic diagrams illustrating aggregation of particles of a fluorescent substance.
Figure 4B:
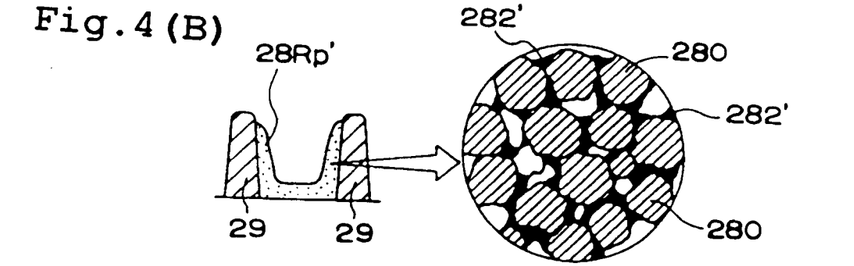
Figure 4C:
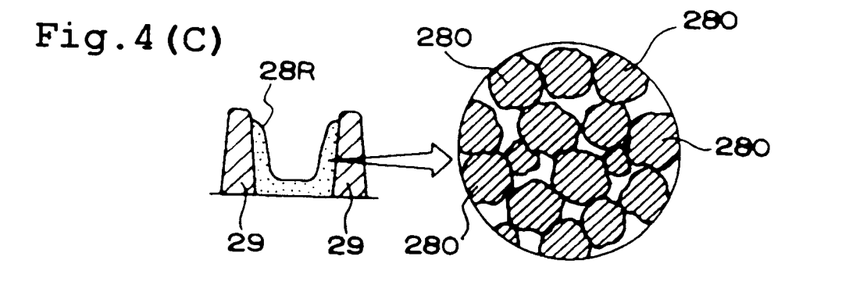

In the fluorescent paste 28Rp shown in FIG. 4(A) fluorescent substance particles 280 and binder resin particles 282 are kept dispersed in a medium 284 immediately after the paste is applied between the ribs. When the fluorescent paste 28Rp is heated at the softening point of the resin 282 for evaporation of the medium 284, a dried paste layer 28Rp' is formed in which the fluorescent substance particles are aggregated (see FIG. 4(B)). At this time, the softened resin 282' attracts the fluorescent substance particles 280. When the paste layer is baked, the resin 282' is burnt out, whereby the fluorescent layer 28R is formed in which the fluorescent substance particles 280 are aggregated as shown in FIG. 4(C).

Figure 5C:
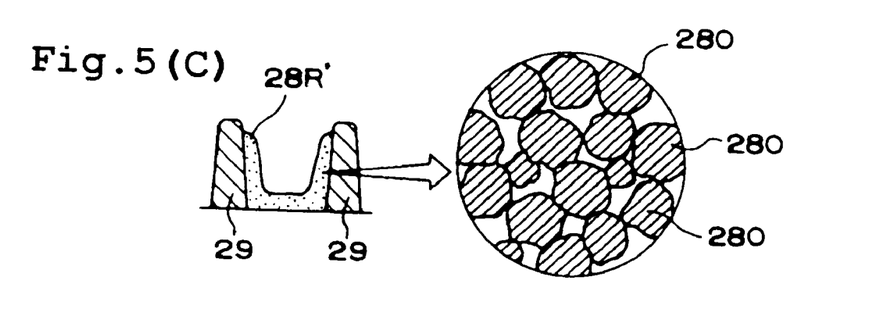

In the fluorescent paste 28Rq shown in FIG. 5(A) coated fluorescent substance particles 281 are kept dispersed in a medium 285. The fluorescent substance particles 281 are each comprised of a fluorescent substance crystal 280 (bare fluorescent substance particle) and a binder resin coating 283 covering all or part of the surface of the crystal. When the fluorescent paste 28Rq is heated for evaporation of the medium 285, a dried paste layer 28Rq' is formed in which the fluorescent substance particles 280 are aggregated (see FIG. 5(B)), like the case shown in FIG. 4(B). When the paste layer 28Rq' is thereafter baked, the resin 283' is burnt out, whereby the fluorescent layer 28R' is formed in which the fluorescent substance particles 280 are aggregated as shown in FIG. 5(C).

The fluorescent paste of the present invention will hereinafter be described by way of Examples thereof.

EXAMPLE 1

For preparation of a vehicle, 2 wt % of acrylic resin beads (available form Soken Chemical Co., Ltd.) having an average diameter of 0.6 μm were dispersed in 1,2,6-hexanetriol by means of a homogenizer. After a mixture of 65 wt % of the vehicle and 35 wt % of a particulate R-fluorescent substance having an average particle diameter of 2 μm was kneaded for one hour, the resulting mixture was degassed in vacuo, and kneaded by means of a roll mill for further dispersion. Thus, a fluorescent paste was obtained.

A thermogravimetric analysis (TG) and a differential thermometric analysis (DTA) were performed on the fluorescent paste for evaluation of the pyrolysis property thereof. The burn-out temperature at which the resin component was burnt out was 379.6° C. Further, the application property of the fluorescent paste (uniformity of coating thickness) was evaluated by applying the fluorescent paste to form a solid coating by the screen printing method. At this time, a 325-mesh screen mask was used, and a process sequence of paste application and drying (120° C., 0.5h) were performed twice. The coating thickness was 9.4 μm on the average and ranged from 8 μm to 12 μm.

It is noted that a fluorescent paste prepared by dispersing fluorescent substance particles coated with the acrylic resin in 1,2,6-hexanetriol (instead of the use of the acrylic resin beads and the bare fluorescent substance particles) exhibited the same pyrolysis property and application property as in Example 1.

Comparative Example 1

As a resin component, 6 wt % of 45-cps ethyl cellulose and 6 wt % of 100-cps ethyl cellulose were dissolved in a solvent. Used as the solvent was a solvent mixture containing butylcarbitol acetate and butylcarbitol. The resultant solution containing the resin component dissolved therein was filtered for preparation of a vehicle. A mixture of 80 wt % of the vehicle and 20 wt % of a particulate fluorescent substance was kneaded, then degassed in vacuo, and subjected to a roll milling process. Thus, a fluorescent paste was obtained.

In the same manner as in Example 1, the pyrolysis property of the fluorescent paste was evaluated by the TG/DTA, and the application property thereof was evaluated by the solid coating printing method. The resin burn-out temperature was 453.4° C., and the coating thickness was 9.57 μm on the average and ranged from 7.5 μm to 12 μm.

Comparative Example 2

As a resin component, 30 wt % of an acrylic resin MP-4009 (available from Soken Chemical Co., Ltd.) was dissolved in a solvent mixture containing butylcarbitol acetate and butylcarbitol for preparation of a vehicle. A mixture of 65 wt % of the vehicle and 35 wt % of a particulate R-fluorescent substance was kneaded, then degassed in vacuo, and subjected to a roll milling process. Thus, a fluorescent paste was obtained.

In the same manner as in Example 1, the pyrolysis property of the fluorescent paste was evaluated by the TG/DTA, and the application property thereof was evaluated by the solid coating printing method. The resin burn-out temperature was 416.2° C., and the coating thickness was 9.5 μm on the average and ranged from 2 μm to 20 μm.

The states and evaluation results of the pastes obtained in Example 1 and Comparative Examples 1 and 2 are collectively shown in Table 1.

TABLE 1

|  | Resin component | State of resin | Burn-out temperature | Variation in coating thickness |
| --- | --- | --- | --- | --- |
| Ex. 1 | Acrylic resin | Dispersed | 379.6° C. | 4.0 μm |
| Com. Ex. 1 | Ethyl cellulose | Dissolved | 453.4° C. | 4.5 μm |
| Com. Ex. 2 | Acrylic resin | Dissolved | 416.2° C. | 18.0 μm |

The evaluation results of Comparative Examples 1 and 2 indicate that the use of the acrylic resin instead of ethyl cellulose can reduce the baking temperature. Where the paste is prepared by dissolving the acrylic resin in the solvent, however, the variation in the coating thickness is increased. As apparent from a comparison between Comparative Example 2 and Example 1, the use of the fluorescent paste containing the particulate acrylic resin dispersed therein can reduce the baking temperature without sacrificing the application property.

In accordance with the present invention, the formation of a fluorescent layer having a uniform and sufficient thickness can be achieved by employing a reduced baking temperature. Further, the present invention realizes the fabrication of a plasma display panel capable of high-quality and bright display free from unevenness in the luminance.

What is claimed is:

1. A fluorescent layer formation process which comprises dispersing particles of a fluorescent substance and particles of a (meth)acrylic resin as a binder or particles of the fluorescent substance coated with the (meth)acrylic resin in a medium incapable of dissolving the resin therein to prepare a fluorescent paste;

applying the fluorescent paste on a fluorescent layer formation surface to form a paste layer; and baking the paste layer at such a temperature that the resin is substantially decomposed or burnt out, thereby to form a fluorescent layer.

2. A fluorescent layer formation process of claim 1, wherein the (meth)acrylic resin is an methyl methacrylate, isobutyl methacrylate, a mixture thereof or a copolymer thereof.

3. A fluorescent layer formation process of claim 1, wherein the particles of the (meth)acrylic resin have an average diameter smaller than the particles of the fluorescent substance.

4. A fluorescent layer formation process of claim 3, wherein the particles of the (meth)acrylic resin have an average diameter not greater than one half the average diameter of the particles of the fluorescent substance.

5. A fluorescent layer formation process of claim 4, wherein the fluorescent substance particles and the resin particles, respectively, are an average diameter of 2 μm to 4 μm and 0.1 μm to 1 μm.

6. A fluorescent layer formation process of claim 1, wherein the fluorescent layer formation surface includes a side wall of a barrier rib partitioning a display area of a plasma display panel.

7. A fluorescent layer formation process of claim 6, wherein the application of the fluorescent paste on the fluorescent layer formation surface including the side wall of the barrier rib is achieved by a screen printing method or by ejecting the fluorescent paste from a nozzle.

8. A fluorescent layer formation process of claim 1, wherein the medium is 1,2,6-hexanetriol or polypropylene glycol.

9. A fluorescent paste comprising a particulate fluorescent substance, a particulate (meth)acrylic resin as a binder and a medium incapable of dissolving the resin therein, the fluorescent substance and the resin being dispersed in the medium.

10. A fluorescent paste comprising particles of a fluorescent substance, at least parts of surfaces of the particles being coated with a (meth)acrylic resin, and a medium incapable of dissolving the resin therein, the fluorescent substance being dispersed in the medium.

11. A method of making a color plasma display panel comprising:

forming a discharge space between a pair of substrates;

forming a mixture of particles of acrylic resin and of a fluorescent substance with a medium incapable of dissolving the resin;

applying the mixture to a surface between a plurality of barrier ribs formed on one of the pair of substrates;

heating the mixture until the resin particles are substantially decomposed or burnt out, thus forming a fluorescent layer between the plurality of ribs; and filling said discharge space above the fluorescent layer with a Penning gas.

* * * * *